«12» United States Patent
Sivaramakrishnan et al.

(10) Patent No.: US 7,281,096 B1
(45) Date of Patent: Oct. 9, 2007

(54) SYSTEM AND METHOD FOR BLOCK WRITE TO MEMORY

(75) Inventors: Ramaswamy Sivaramakrishnan, San Jose, CA (US); Sunil Vemula, Sunnyvale, CA (US); Sanjay Patel, Fremont, CA (US); James P. Laudon, Madison, WI (US)

(73) Assignee: Sun Microsystems, Inc., Santa Clara, CA (US)

( * ) Notice: Subject to any disclaimer, the term of this patent is extended or adjusted under 35 U.S.C. 154(b) by 179 days.

(21) Appl. No.: 11/054,850

(22) Filed: Feb. 9, 2005

(51) Int. Cl.
*G06F 13/14* (2006.01)

(52) U.S. Cl. ....................... 711/152; 711/200

(58) Field of Classification Search ............... 365/200; 711/108, 200, 165, 152
See application file for complete search history.

(56) References Cited

U.S. PATENT DOCUMENTS 6,449,700 B2 *  9/2002  Hagersten et al. .......... 711/152
7,017,005 B2 *  3/2006  Stark ........................ 711/108
2003/0061457 A1 *  3/2003  Geiger et al. ............... 711/165
2004/0218435 A1 * 11/2004  Takahashi et al. .......... 365/200

* cited by examiner

*Primary Examiner*—Hyung Sough
*Assistant Examiner*—Kenneth M Lo
(74) *Attorney, Agent, or Firm*—Martine Penilla & Gencarella, LLP

(57) ABSTRACT

A hardware implemented method for writing data to a cache is provided. In this hardware implemented method, a Block Initializing Store (BIS) instruction is received to write the data from a processor core to a memory block. The BIS instruction includes the data from the processor core. Thereafter, a dummy read request is sent to a memory controller and known data is received from the memory controller without accessing a main memory. The known data is then written to the cache and, after the known data is written, the data from the processor core is written to the cache. A system and processor for writing data to the cache also are described.

12 Claims, 4 Drawing Sheets

SYSTEM AND METHOD FOR BLOCK WRITE TO MEMORY

BACKGROUND OF THE INVENTION

1. Field of the Invention

This invention relates generally to computer memory and, more particularly, to system and method for writing data to a cache on a cache miss.

2. Description of the Related Art

A cache is a small, fast memory holding recently accessed data that is designed to speed up subsequent processor-memory access to the same data. When data is written to or read from a main memory, a copy of the data is also saved in the cache, along with the associated main memory address. The cache monitors addresses of subsequent reads and writes to see if the requested data is already in the cache. If the requested data is stored in the cache (a cache hit), then the requested data is returned immediately and the main memory read is aborted. If the requested data is not stored in the cache (a cache miss), then the requested data is fetched from main memory and saved in the cache.

If there is a cache miss during a write, the cache puts all writes into the appropriate cache line whenever a write is done based on the general assumption that the written data is likely to be read back again at some point in the near future. In other words, the cache will always retrieve the data from the main memory on a cache miss even on a write operation where the data from the main memory is not needed. Thus, retrieving the data from the main memory during a cache miss means that on a write cache miss, the cache controller must always update the cache. Updating the cache after fetching data from main memory increases latency, and takes up memory bandwidth and power.

In view of the foregoing, there is a need to provide system and method for reducing latency, and reducing memory power and bandwidth consumption on a write operation missing the cache.

SUMMARY OF THE INVENTION

Broadly speaking, the present invention fills these needs by providing a system and hardware implemented method for writing data to a cache. It should be appreciated that the present invention can be implemented in numerous ways, including as a method, a system, or a device. Several inventive embodiments of the present invention are described below.

In accordance with a first aspect of the present invention, a hardware implemented method for writing data to a cache is provided. In this method, a Block Initializing Store (BIS) instruction is received to write the data from a processor core to a memory block. The BIS instruction includes the data from the processor core. Thereafter, a dummy read request is sent to a memory controller and known data is received from the memory controller without accessing main memory. The known data is then written to the cache and, after the known data is written, the data from the processor core is written to the cache.

In accordance with a second aspect of the present invention, a processor having circuitry for writing data to a cache is provided. The processor includes circuitry for receiving an instruction to write the data from a processor core to a memory block. The instruction includes the data from the processor core. In addition, the processor includes circuitry for determining whether the instruction is a BIS instruction, and circuitry for determining whether the BIS instruction is to address zero of a cache line. The processor also includes circuitry for sending a dummy read request to a memory controller if the BIS instruction is to address zero.

In accordance with a third aspect of the present invention, a system for writing data to a cache is provided. The system includes a processor core and a cache in communication with the processor core. The cache includes circuitry for receiving a BIS instruction to write the data from the processor core to a memory block, whereby the BIS instruction includes the data from the processor core. The cache additionally includes circuitry for sending a dummy read request to a memory controller and circuitry for writing known data to the cache, whereby the known data is received from the memory controller. Further, the cache includes circuitry for writing the data from the processor core to the cache over the known data written into the cache.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for system and hardware implemented method for writing data to a cache. It will be obvious, however, to one skilled in the art, that the present invention may be practiced without some or all of these specific details. In other instances, well known process operations have not been described in detail in order not to unnecessarily obscure the present invention.

The embodiments described herein provide system and hardware implemented method for writing data to a cache on a cache miss. In one embodiment, a memory controller does not access a main memory on a write cache miss. In other words, the memory controller does not fetch from the main memory on a write cache miss. In particular, as will be explained in more detail below, a processor core sends a Block Initializing Store (BIS) instruction to write data to a memory block. In response, a dummy read request is sent to the memory controller and, as a result, the memory controller sends known data to the cache without accessing the main memory. Thereafter, the known data in the cache is overwritten with the data from the processor core.

Figure 1:
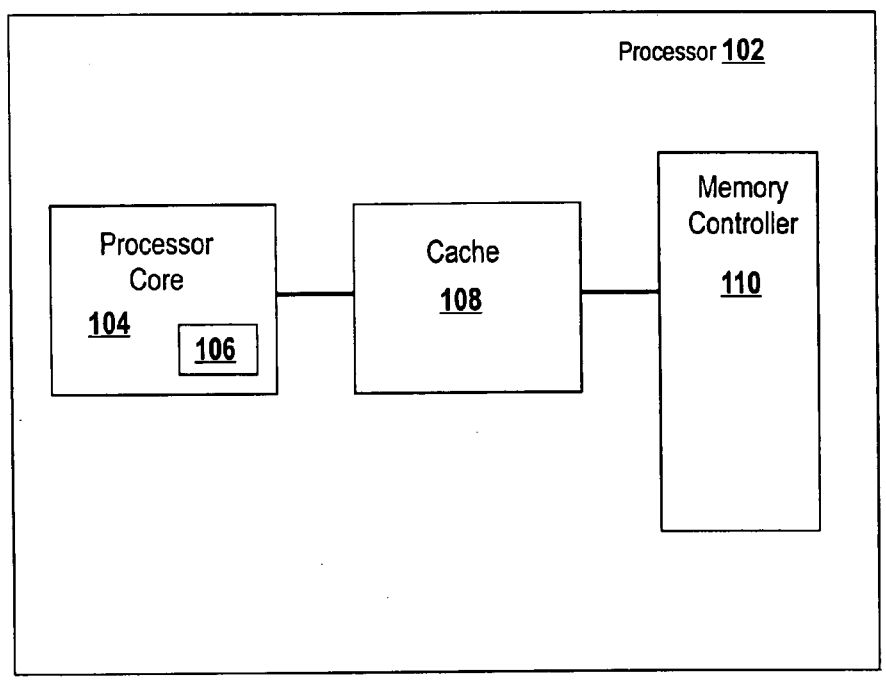
FIG. 1 is a simplified block diagram of a processor, in accordance with one embodiment of the present invention.

FIG. 1 is a simplified block diagram of a processor, in accordance with one embodiment of the present invention. As shown in FIG. 1, processor 102 includes processor core 104, cache 108, and memory controller 110. Processor 102 is logic circuitry that responds to and processes the basic instructions that drive a computer device. Exemplary processors include reduced instruction set computer (RISC) microprocessors, Intel Pentium processors, AMD Athlon processors, PowerPC processors, etc. Processor core 104 is the central portion of processor 102, and includes storage buffer 106. Cache 108 is a memory used for temporary storage by both processor core 104 and a main memory. In one exemplary embodiment, cache 108 is made of high speed static random access memory (SRAM) instead of a slower and cheaper dynamic random access memory (DRAM) typically used for the main memory. Cache 108 may be built into processor 102, such as a level-1 (L1) cache, or may additionally include external or internal caches, such as level-2 (L2) cache, level-3 (L3) cache, etc.

Processor 102 also includes memory controller 110 that provides the control and interface for main memory. For example, as will be explained in more detail below, memory controller 110 may include circuitry for receiving dummy read requests and circuitry for sending zeros to the cache in response to receiving the dummy read request without fetching from a main memory. In one exemplary embodiment, if the main memory is a DRAM, memory controller 110 is a DRAM memory controller. It should be appreciated that memory controller 110 may be built into processor 102 or external to the processor.

Figure 2:
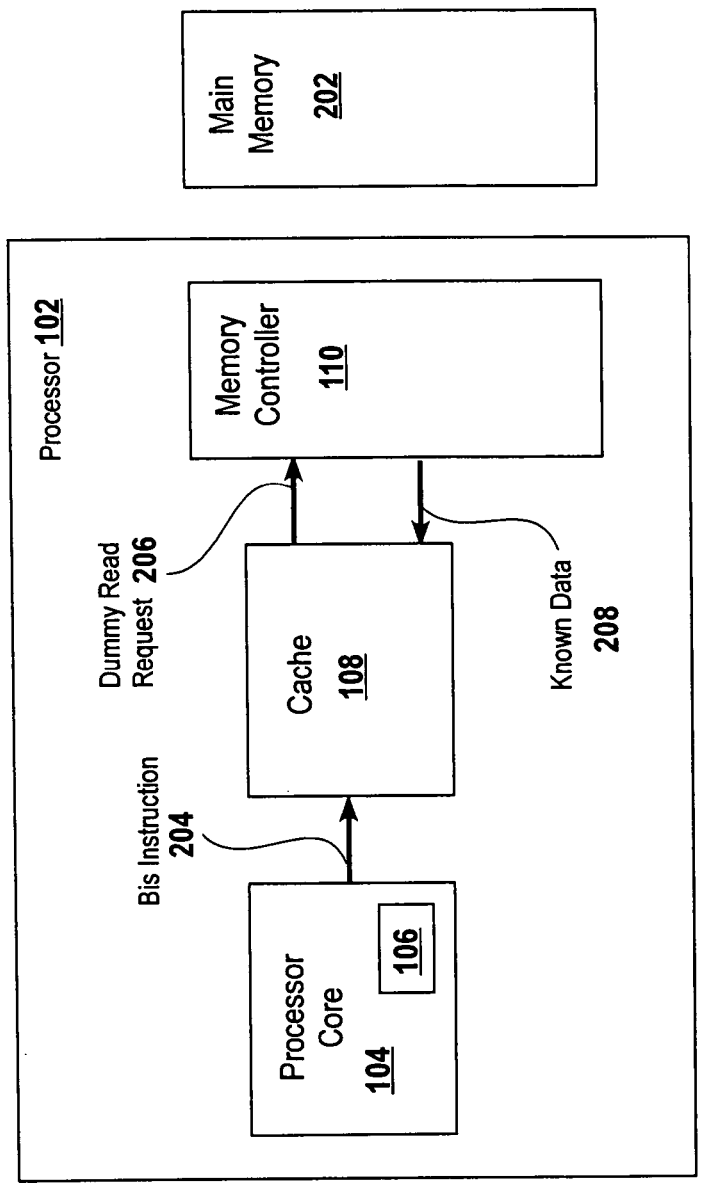
FIG. 2 is a simplified block diagram of a system for writing data to a cache on a cache miss, in accordance with one embodiment of the present invention.

FIG. 2 is a simplified block diagram of a system for writing data to a cache on a cache miss, in accordance with one embodiment of the present invention. As shown in FIG. 2, in one embodiment, processor 102 includes processor core 104, cache 108, and memory controller 110. External to processor 102 is main memory 202. Main memory 202 may include any suitable memory. For example, as discussed above, main memory 202 may be a DRAM. The system of FIG. 2 may be incorporated into any suitable computing device. Exemplary computing devices include servers, desktop computers, personal digital assistants, workstations, supercomputers, etc.

FIG. 2 shows processor core 104 sending a BIS instruction 204 to cache 108. As will be explained in more detail below, BIS instruction 204 is an instruction used for transferring blocks of data without accessing main memory 202. In other words, BIS instruction 204 is an instruction to write data from storage buffer 106 of processor core 104 to a memory block. It should be appreciated that the data for transfer to the memory block is included within BIS instruction 204. Cache 108 then receives BIS instruction 204 from a thread and in response, sends dummy read request 206 to memory controller 110. Dummy read request 206 is a request that does not require an actual read from main memory 202.

Memory controller 110 receives dummy read request 206 and sends known data 208 to cache 108 foregoing access to main memory 202 in response to the received dummy read request. Known data 208 may include any suitable numerical value or data pattern as specified by BIS instruction 204. Exemplary known data 208 include zeroes, ones, 0xdeadbeef hex data pattern, etc. In other words, known data 208 is a predetermined value or data pattern sent by memory controller 110 to cache 108 without accessing main memory 202 in response to dummy read request 206. Cache 108 then receives known data 208 from memory controller 110 and writes the known data to the cache. After known data 208 is written to cache 108, the cache writes the data from processor core 104 to the cache.

Figure 3:
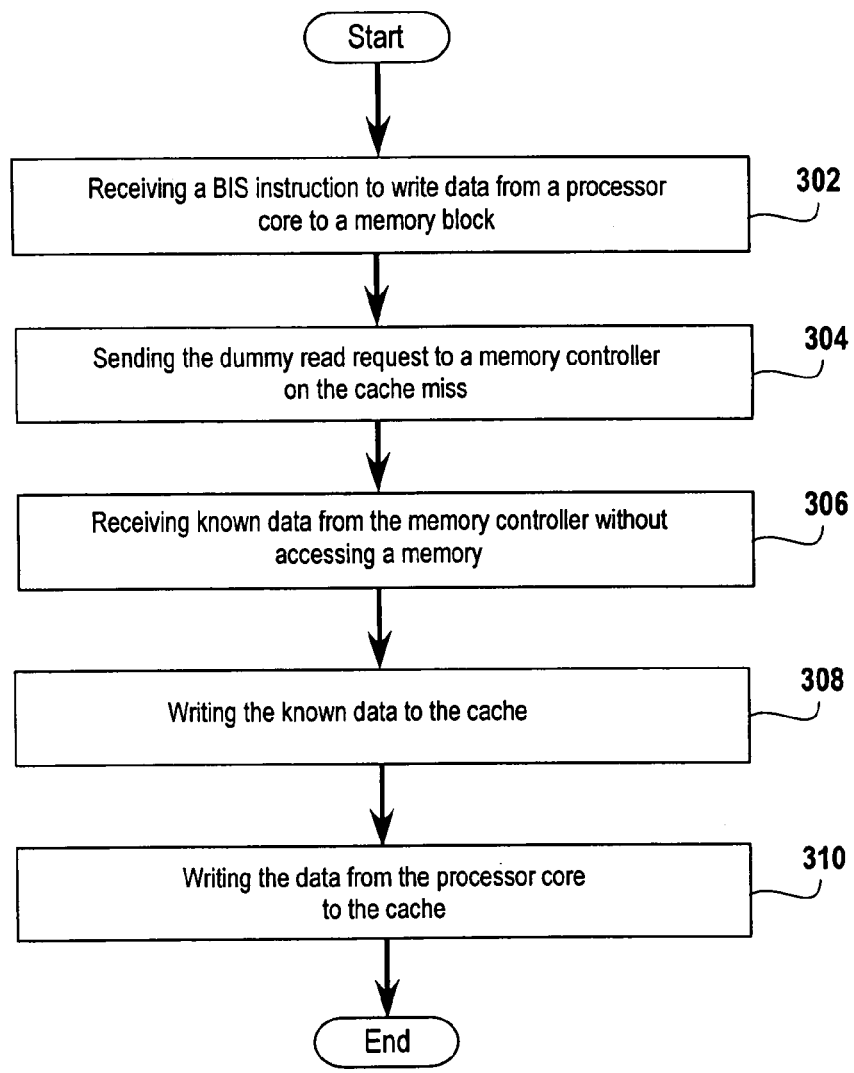
FIG. 3 is a flowchart diagram of high level method operations for writing data to a cache on a cache miss, in accordance with one embodiment of the present invention.

FIG. 3 is a flowchart diagram of high level method operations for writing data to a cache on a cache miss, in accordance with one embodiment of the present invention. Starting in operation 302, a BIS instruction is received to write data from a processor core to a memory block. As discussed above, the BIS instruction includes the data from the processor core. Subsequently, in operation 304, a dummy read request is sent to the memory controller on a cache miss. As discussed above, a cache hit is when the requested data is found in the cache and, conversely, a cache miss is when the requested data is not found in the cache. As a result of sending the dummy read request, known data is received from the memory controller without the memory controller accessing a main memory in operation 306. The known data is then written to the cache in operation 308 and thereafter, the data from the processor core is written to the cache in operation 310. In other words, after the known data is written to the cache, the known data is overwritten with the data from the processor core.

Figure 4:
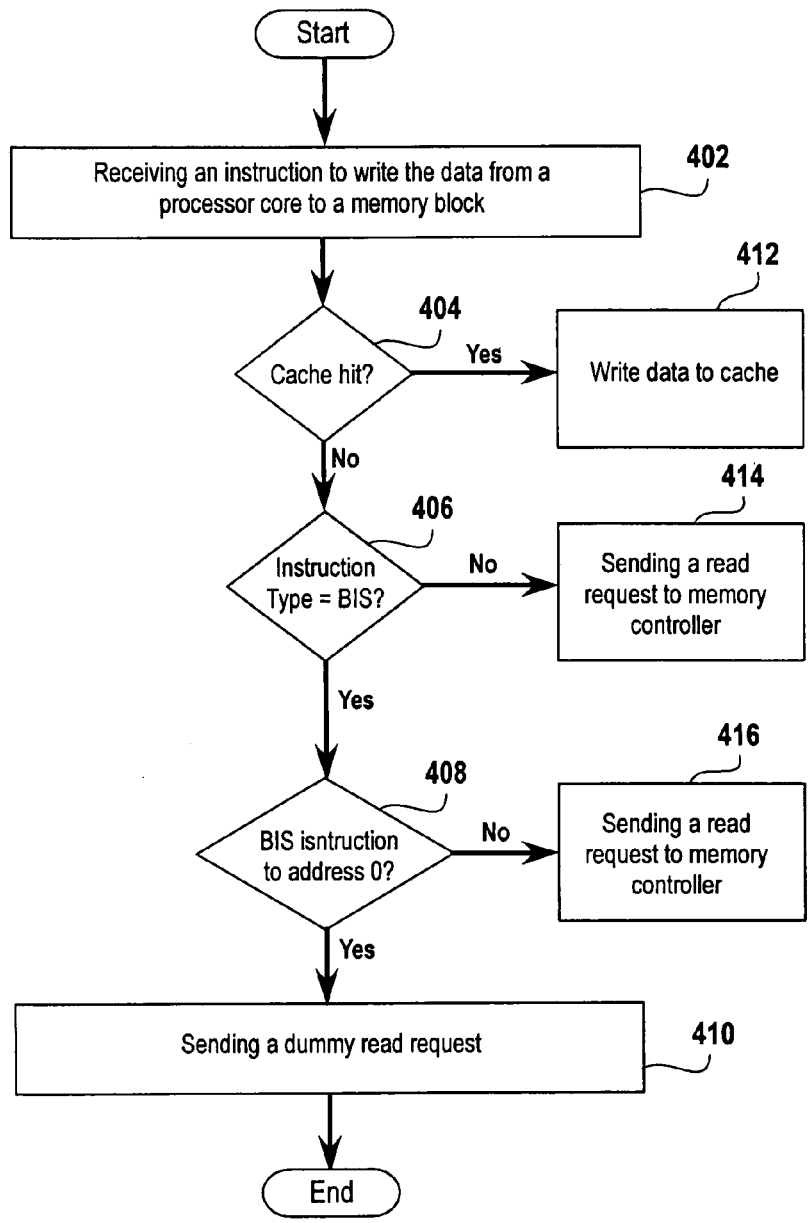
FIG. 4 is a more detailed flowchart diagram of the method operations for writing data to a cache on a cache miss, in accordance with one embodiment of the present invention.

FIG. 4 is a more detailed flowchart diagram of the method operations for writing data to a cache on a cache miss, in accordance with one embodiment of the present invention. Starting in operation 402, an instruction is received from a thread to write data from a store buffer of a processor core to a memory block. It should be appreciated that if a data path between the processor core and the cache is smaller than the size of the data, instead of a single instruction, multiple instructions to write portions of the data to the memory block may be received over several clock cycles, in accordance with one embodiment of the present invention. Dividing the single instruction into multiple instructions allows a small data path to handle large blocks of data, and allows store requests from different threads to be interleaved with each other. It should be noted that the terms "store" and "write" may be used interchangeably. Thereafter, in operation 404, a determination is made on whether the data is found in the cache (i.e., a cache hit). If the data is found in the cache, then the data is written to the cache in operation 412. On the other hand, if the data is not found in the cache (i.e., a cache miss), another determination is made in operation 406 on whether the received instruction is a BIS instruction. In particular, a determination is made on whether the type contained within the received instruction is a BIS.

In one embodiment, BIS instructions may be selected by using block initializing address store identifiers (ASIs) with integer store instructions. The following Table A shows exemplary BIS opcodes for an UltraSPARC™ processor developed by the assignee.

TABLE A

| Opcode | imm_asi | ASI Value | Operation |
| --- | --- | --- | --- |
| ST {B,H,W,X,D} A | ASI_BLK_INIT_QUAD_LDD_AIUP | $22_{16}$ | 64-byte block initialing store from/to primary address space, user privilege |
| ST {B,H,W,X,D} A | ASI_BLK_INIT_QUAD_LDD_AIUS | $23_{16}$ | 64-byte block initialing store from/to secondary address space, user privilege |
| ST {B,H,W,X,D} A | ASI_NUCLEUS_BLK_INIT_QUAD_LDD | $27_{16}$ | 64-byte block initialing store from/to nucleus address space |
| ST {B,H,W,X,D} A | ASI_BLK_INIT_QUAD_LDD_AIUPL | $2A_{16}$ | 64-byte block initialing store from/to primary address space, user privilege, little-endian |
| ST {B,H,W,X,D} A | ASI_BLK_INIT_QUAD_LDD_ | $2B_{16}$ | 64-byte block initialing store from/to |

TABLE A-continued

| Opcode | imm_asi | ASI Value | Operation |
|---|---|---|---|
| | AIUSL | | secondary address space, user privilege, little-endian |
| ST {B,H,W,X,D} A | ASI_NUCLEUS_BLK_INIT_QUAD_LDD_L | $2F_{16}$ | 64-byte block initializing store from/to nucleus address space, little-endian |
| ST {B,H,W,X,D} A | ASI_BLK_INIT_QUAD_LDD_P | $E2_{16}$ | 64-byte block initializing store from/to primary address space |
| ST {B,H,W,X,D} A | ASI_BLK_INIT_QUAD_LDD_S | $E3_{16}$ | 64-byte block initializing store from/to secondary address space |
| ST {B,H,W,X,D} A | ASI_BLK_INIT_QUAD_LDD_PL | $EA_{16}$ | 64-byte block initializing store from/to primary address space, little-endian |
| ST {B,H,W,X,D} A | ASI_BLK_INIT_QUAD_LDD_SL | $EB_{16}$ | 64-byte block initializing store from/to secondary address space, little-endian |

These ASIs allow block initializing stores to be performed to the same address spaces as normal loads and stores. Little-endian ASIs, where bytes at lower addresses have lower significance, access data in little-endian format. Otherwise, the access is assumed to be big-endian, where the most significant byte has the lowest address. Integer stores of all sizes are allowed with these ASIs. Stores to these ASIs operate under relaxed memory ordering (RMO), regardless of the memory model setting, and software follows a sequence of these stores with a member sync to ensure ordering with respect to subsequent loads and stores. A reason for executing BIS instructions with the RMO is that RMO increases write throughput of the stores. Exemplary BIS assembly language syntax for an UltraSPARC™ processor is shown in the following Table B.

TABLE B

| st {b, h, w, x, d}a | $reg_{rd}$, [reg_addr] imm_asi |
|---|---|
| st {b, h, w, x, d}a | $reg_{rd}$, [reg_plus_imm] % asi |

Still referring to FIG. 4, if the instruction type is not BIS, then a read request is sent to the memory controller in operation 414. This read request instructs the memory controller to access the main memory. In other words, the memory controller will fetch the cache line from the main memory in response to this read request. However, in one embodiment, if the instruction type is BIS, another determination is made in operation 408 on whether the BIS instruction is to address zero of the cache line. If the BIS instruction is not to address zero, then a read request is sent to the memory controller in operation 416. However, if the BIS instruction is made to address zero, then a dummy read request is sent to the memory controller in operation 410. Thereafter, as discussed above, in response to the dummy read request, known data received from memory controller is written to the memory block at a memory address indicated by the BIS instruction. In other words, as instructed by the dummy read request, the memory controller sends known data to the cache. It should be appreciated that no special modifications are made to the memory controller to process the BIS instructions and dummy read requests.

A determination of whether the BIS instruction is to address zero is made in operation 408 in order to assure that the BIS instruction is writing the data to a complete memory block. Thus, operation 408 protects the portion of data within the memory block that is not being accessed from deletion. For example, if BIS instruction is received for writing data to addresses A1 and A2 of the memory block, then all other data stored in addresses other than A1 and A2 are not to be overwritten, as the processor core may later need to access these other data. If a determination is not made in operation 408, then the entire memory block, which includes data in addresses A1 and A2, will be overwritten with known data in response to a dummy read request. As an instruction, such as BIS instruction, to write to address zero signifies that data is to be written to the complete memory block, operation 408 assures that a dummy read request is sent for a BIS instruction that writes data to the complete memory block. Subsequent BIS instructions (i.e., BIS instructions to memory addresses other than address zero of the cache line) are treated like regular stores to the cache. For example, in the UltraSPARC™ processor discussed above, stores to ASIs where the bottom six bits of the address are not zeros (i.e., not the first word in the cache line) behave the same as a normal RMO store. However, a store to these ASIs where the bottom six bits are zeros will load a cache line in the cache with either all known data or the existing data, and then update that cache line with data from processor core. This store makes the cache line maintain coherency when the cache line is loaded into the cache, but will not fetch the cache line from main memory (initializing the cache line with known data instead). Stores using these ASIs to a non-cacheable address (e.g., PA<39>=1) will behave the same as a normal store. Access to these ASIs by a load other than little-endian doubleword load from alternate space (LDDA) will result in a data_access_exception trap (or mem_address_not_aligned trap if not properly aligned for the load size). Access to these ASIs by a floating-point store (store floating-point into alternate space (STFA) and store double floating-point into alternate space (STDFA)) will also result in a data_access_exception trap (or mem_address_not_aligned trap if not properly aligned for the store size).

In summary, the above described invention provides system and hardware implemented methods for writing data to a cache on a cache miss. Unlike the typical memory controller that will always fetch the data from the main memory on a write cache miss, the embodiments described above do not access the main memory on write cache misses. The reduction of main memory accesses reduce latency, and decrease memory power and bandwidth consumption.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A hardware implemented method for writing data to a cache, comprising method operations of:
   receiving a Block Initializing Store (BIS) instruction to write the data from a processor core to a memory block, the BIS instruction including the data from the processor core;
   determining whether the BIS instruction is to address zero of a cache line;
   if the BIS instruction is to the address zero, sending a dummy read request to a memory controller;
   receiving known data from the memory controller without accessing a main memory;
   writing the known data to the cache; and
   writing the data from the processor core to the cache after writing the known data.

2. The hardware implemented method of claim 1, wherein the dummy read request is a request that does not require an actual read from the main memory.

3. The hardware implemented method of claim 1, wherein the BIS instruction is received from the processor core and the BIS instruction misses the cache.

4. The hardware implemented method of claim 1, further comprising:
   if a data path between the processor core and the cache is smaller than size of the data, receiving a plurality of the BIS instructions to write portions of the data to the memory block.

5. The hardware implemented method of claim 1, wherein the method operation of writing the known data to the cache includes,
   writing zeros to the cache without accessing the main memory.

6. The hardware implemented method of claim 1, further comprising:
   sending a read request to the memory controller, the read request enabling the memory controller to access the main memory.

7. The hardware implemented method of claim 1, wherein the method operation of writing the known data to the cache includes,
   writing the known data to the cache at a memory address indicated by the BIS instruction.

8. A processor having circuitry for writing data to a cache, comprising:
   circuitry for receiving an instruction to write the data from a processor core to a memory block, the instruction including the data from the processor core;
   circuitry for determining whether the instruction is a Block Initializing Store (BIS) instruction;
   circuitry for determining whether the BIS instruction is to address zero of a cache line; and
   circuitry for sending a dummy read request to a memory controller if the BIS instruction is to the address zero.

9. The processor of claim 8, further comprising:
   circuitry for receiving known data from the memory controller;
   circuitry for writing the known data to the cache; and
   circuitry for writing the data from the processor core to the cache after writing the known data.

10. The processor of claim 9, wherein the known data is defined by one of a zero, a one, or a data pattern.

11. The processor of claim 8, wherein the memory controller includes,
   circuitry for receiving the dummy read request; and
   circuitry for sending known data to the cache forgoing access to a main memory in response to the received dummy read request.

12. The processor of claim 8, further comprising:
   circuitry for receiving a plurality of the BIS instructions to write portions of the data to the memory block if a data path between the processor core and the cache is smaller than size of the data.

* * * * *